United States Patent
Winner et al.

(10) Patent No.: US 6,469,654 B1
(45) Date of Patent: Oct. 22, 2002

(54) TRANSPONDER LANDING SYSTEM

(75) Inventors: Karl Winner, Home Valley, WA (US); Benjamin R. Kuehn, Hood River, OR (US)

(73) Assignee: Advanced Navigation & Positioning Corp., Hood River, OR (US)

(*) Notice: Subject to any disclaimer, the term of this patent is extended or adjusted under 35 U.S.C. 154(b) by 0 days.

(21) Appl. No.: 09/695,359

(22) Filed: Oct. 24, 2000

Related U.S. Application Data

(60) Provisional application No. 60/203,039, filed on May 29, 2000.

(51) Int. Cl.[7] .............................. G01S 13/00; G01S 3/02
(52) U.S. Cl. ........................... 342/33; 342/42; 342/46; 342/51; 342/410; 342/463; 342/465
(58) Field of Search .......................... 342/33–40, 42–51, 342/175, 195, 29, 30, 31, 32, 165, 169, 170, 171–174, 197, 417, 420, 422, 423–426, 432–449, 410, 411, 412, 413, 451, 463, 464, 465

(56) References Cited

U.S. PATENT DOCUMENTS

| | | | |
|---|---|---|---|
| 3,564,543 A | | 2/1971 | Nehama et al. |
| 3,696,415 A | * | 10/1972 | Ballantyne .................. 342/197 |
| 4,454,510 A | | 6/1984 | Crow |
| 5,017,930 A | | 5/1991 | Stoltz et al. |
| 5,075,694 A | | 12/1991 | Donnangelo et al. |
| 5,144,315 A | | 9/1992 | Schwab et al. |
| 5,179,384 A | | 1/1993 | De Haan |
| 5,262,784 A | | 11/1993 | Drobnicki et al. |
| 5,400,031 A | | 3/1995 | Fitts |
| 5,463,398 A | | 10/1995 | Young |
| 5,552,788 A | * | 9/1996 | Ryan et al. .................... 342/30 |
| 5,596,326 A | * | 1/1997 | Fitts ............................ 342/30 |
| 5,627,546 A | | 5/1997 | Crow |

FOREIGN PATENT DOCUMENTS

| | | | |
|---|---|---|---|
| DE | 2743370 A1 | 8/1982 | |
| EP | 0249493 A2 | * 12/1987 | ........... G01S/13/93 |

OTHER PUBLICATIONS

PCT Written Opinion; Apr. 30, 2002; Examiner Fanjul Caudevilla, J.
Declaration of Karl Winner; Executed Jan. 14, 2002.

* cited by examiner

*Primary Examiner*—Bernarr E. Gregory
(74) *Attorney, Agent, or Firm*—Benesch, Friedlander, Coplan & Aronoff, LLP

(57) ABSTRACT

A ground-based, precision aircraft landing system provides CAT I precision approach and landing guidance. The aircraft elevation position is determined by measuring differential carrier phase and time-of-arrival of the aircraft ATCRBS transponder reply. The transponder reply is received at a plurality of sensor antenna locations where it is then conveyed to a sensor, demodulated and digitized. The data is transmitted to a central processor where calibration and multipath corrections are applied. Aircraft transponder diversity antenna switching is isolated from the jitter and colored noise of transponder reply multipath by correlating differential phase jumps measured between separate sensor antennas. An estimate of the diversity antenna separation is maintained by Kalman filter processing; the estimated separation is used to correct the differential phase measurement data of aircraft elevation. The corrected phase measurement and time-of-arrival measurement is processed using another Kalman filter to achieve the desired aircraft elevation positioning accuracy. A similar differential carrier phase and time-of-arrival subsystem is applied to achieve an azimuth measurement of the aircraft position. The combined azimuth and elevation of the aircraft is then compared to the desired approach path, and the aircraft position error relative to the desired approach is communicated to the aircraft.

20 Claims, 5 Drawing Sheets

TRANSPONDER LANDING SYSTEM

CROSS-REFERENCE TO RELATED APPLICATION

This application claims priority under 35 U.S.C. section 119(e) from U.S. Provisional Application No. 60/203,039 filed on May 9, 2000.

BACKGROUND OF THE INVENTION

The present application relates to navigation systems. The invention finds particular application in aircraft landing systems which provide precision elevation guidance to a user, such as a controller or pilot during approach and landing.

Various precision aircraft landing systems have been employed to assist a pilot in maintaining a desired glide path to a runway. The Instrument Landing System (ILS) is commonly used for precision approaches; however, ILS systems are prone to interference from nearby FM broadcasts, require extensive terrain grading and property acquisition at some airport sites and are vulnerable to guidance beam distortion when considering construction near an airport. The Microwave Landing System (MLS) is much less commonly employed than ILS, and is being phased out in response to economic concerns. Precision Approach Radar (PAR) are commonly used in military environments and require a ground operator to verbally convey glide path guidance corrections to the pilot via a communications link. Global Positioning System based landing aids have been proposed which include two systems under development, the Wide Area Augmentation System (WAAS) and the Local Area Augmentation System (LAAS) both of which are subject to jamming and spoofing, and may not be suitable for sole means precision approach.

Aircraft navigation systems which employ the Air Traffic Control Radar Beacon System (ATCRBS) transponder are generally known in the art. Transponders are typically deployed on aircraft to facilitate the Secondary Surveillance Radar (SSR) function of monitoring and controlling enroute aircraft. Most commercial aircraft are equipped with two transponder antennas, one on the top and another on the bottom of the aircraft's fuselage to maintain reliable transponder replies during aircraft turns. Such transponder antenna configurations are known as diversity antennas. A transponder equipped with diversity antennas selects the antenna which received the highest amplitude interrogation signal from a ground station to transmit the coded reply message. International Standards and Recommended Practices presently require that the horizontal distance between the top and the bottom antennas be less than 7.6 meters, in order to control the apparent SSR range jitter from reply to reply due to antenna diversity switching. The vertical separation of diversity antennas varies as a function of aircraft fuselage height and can be approximately between 3 and 10 meters.

Landing systems which use the ATCRBS transponder must determine the aircraft's position, compare it to a desired approach path, and transmit any required correction to the aircraft. Nehama U.S. Pat. No. 3,564,543 describes such a system, which uses symmetry and simplified mathematics to define a conical approach path. In general, the position determining system disclosed in Nehama and like systems is based on transponder reply time-of-arrival measurements derived from the time required for the interrogation to travel to the transponder, for the time for transponder to respond, and the time required for signals to travel between the landing aircraft and a plurality of locations on the ground. From these distances, the aircraft's position is estimated. The Nehama patent acknowledges the existence of variable transponder reply time which can induce substantial errors in the navigation solution. As a compromise, Nehama arranges the transmitter and sensors in a substantially vertical geometric plane transverse to the length of the runway. This arrangement projects the error in a horizontal direction along the axis of the runway. As a side effect, this arrangement requires the use of elevated antenna towers in the vicinity of the airport, for if all the sensors were positioned at ground level, and thus in a horizontal plane, the calculated altitude of the aircraft would contain substantial errors, which would be impermissible for a precision landing system.

Stoltz U.S. Pat. No. 5,017,930 discloses a system which advances over Nehama by, among other things, also solving for transponder encoding delay by employing four sensors. Unfortunately, the time of arrival measurements used by landing systems such as that described in Nehama and Stoltz are subject to significant multipath errors. These multipath errors are induced by terrain features along the approach path to the runway and induce errors in the time of arrival measurements. Errant time of arrival measurements degrade the navigational solution, and thus reduce the accuracy of guidance signals transmitted to the aircraft.

It is desirable for landing systems to comply with the International Standards and Recommended Practices limit on the excursion characteristics of the navigation on-path signal which includes bends, scalloping, roughness and other aberrations with a two-sigma limit roughly equivalent to 3 meters at a point 1.4 km from the glide path Point of Runway Intercept. Unfortunately, diversity antenna switching, even on the smallest aircraft, can potentially cause performance out of this window.

The present invention contemplates an improved method and apparatus which overcomes the above referenced problems and others.

SUMMARY OF THE INVENTION

In accordance with one aspect of the present invention, a method of determining a position of an aircraft having a transponder which transmits a reply signal in response to an interrogation signal includes first receiving reply signals on a plurality of antennas disposed as a vertically oriented array. Characteristics of the reply signal, such as differential phase, amplitude, frequency and the like, are measured and used to estimate the aircraft position. The differential phase is analyzed between at least two reply signals to determine whether respective reply signals originate from different antennas on the aircraft. In the event the reply signals are determined to originate from diversity antennas, the estimated position is adjusted to compensate for the distance between the respective antennas. The method also can calculate an error between the adjusted position and a desired position and convey this error to a user such as a pilot, air traffic controller, or to cockpit displays of other aircraft.

A precision aircraft landing system determines on a real-time basis the location of an aircraft by measuring elapsed time between interrogation and transponder reply signal at a plurality of predetermined locations. The system manages the effects of multipath and achieves accurate aircraft positioning by measuring the transponder reply differential phase to compute angle-of-arrival.

The present invention has the capability to compensate for transponder diversity antenna switching, and as a consequence of this compensation, achieve an elevation estimate with the least dynamic lag.

In accordance with another aspect of the present invention, a multipath correction is applied to the selected characteristics to compensate for multipath errors induced in the estimated position, thereby achieving the best possible detection and compensation for diversity antenna.

One advantage of the present invention resides in the ability to precisely determine aircraft position based on a cooperative transponder reply signal originating from an aircraft.

Another advantage of the present invention resides in the ability to manage or cancel the effects of multipath returns of the transponder reply signal.

Another advantage of the present invention resides in the ability to accurately determine aircraft position by measuring both transponder reply angle of arrival and time of arrival.

Still further advantages will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The Figures are only for purposes of illustrating the preferred embodiments and are not to be construed as limiting the invention.

DETAILED DESCRIPTION OF THE INVENTION

Figure 1:
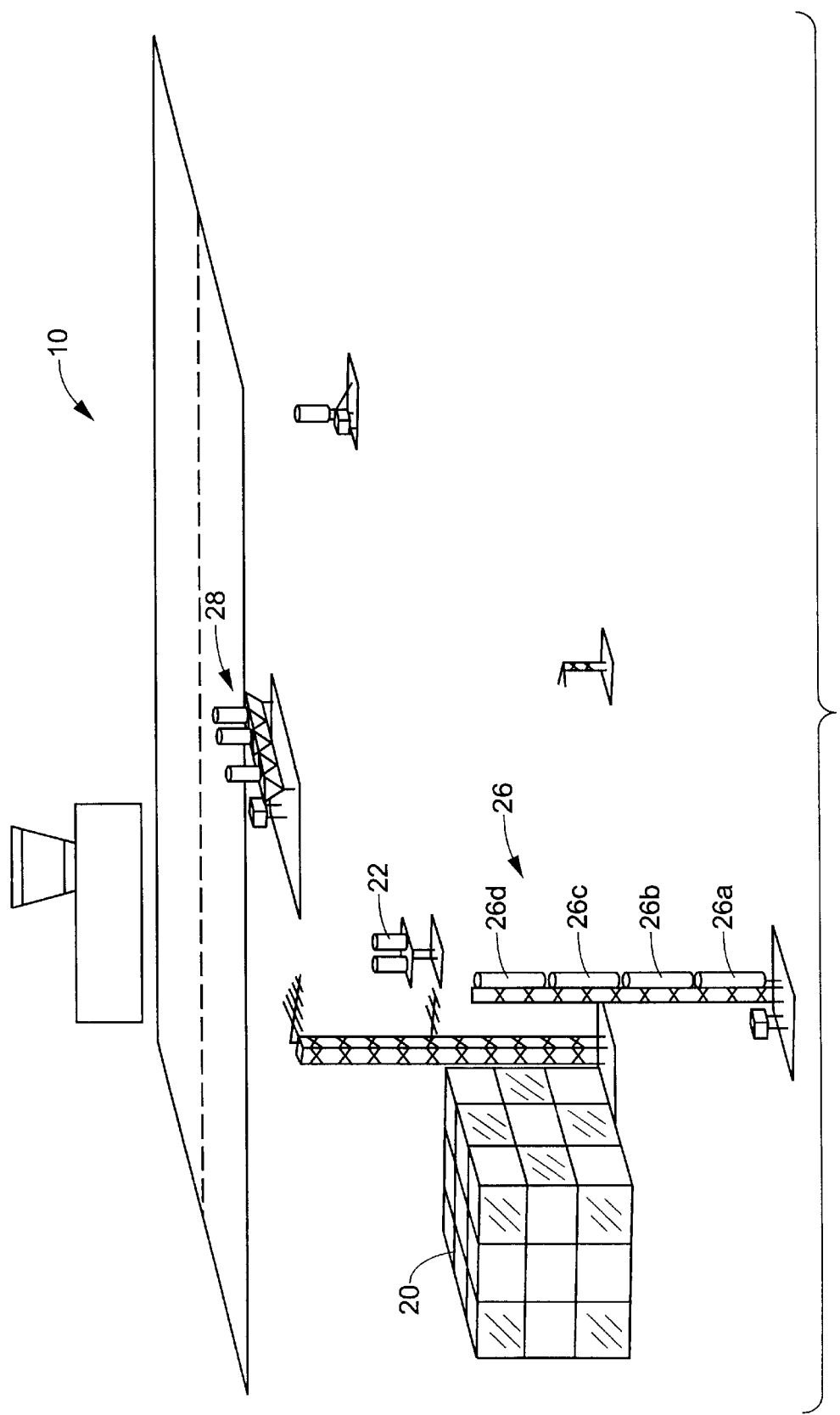
FIG. 1 is a perspective drawing illustrating the elements of the Transponder Landing System in accordance with this invention.

Referring now to FIG. 1, an airport having a runway 10 is shown. A precision aircraft landing system according to the present invention operates to guide an aircraft along a predefined approach path (not shown), which leads to the runway 10.

The system includes, an interrogation transmitter housed in the base station shelter 20 that is used to generate interrogation and suppression pulses. The interrogation signal, composed of pulses modulated onto a carrier frequency, emanates from an interrogation antenna 22. As will be more fully discussed below, a timing signal 76 is also sent from the base station 20, coincident with the interrogation signal to receiver arrays 26, 28 to synchronize sensor measurement processing. A transponder 86 (FIGS. 3, 4) on, for example an aircraft, transmits a reply signal which is also composed of pulses modulated onto a carrier frequency in response to receiving the interrogation signal. The reply signal is received by receiver arrays 26, 28 and are forwarded, preferably to dual dissimilar processors 78a, 78b (FIG. 2) within the base station 20 for processing. The reply signals are processed, as discussed below, for various characteristics such as time, amplitude, frequency and differential carrier phase.

Figure 2:
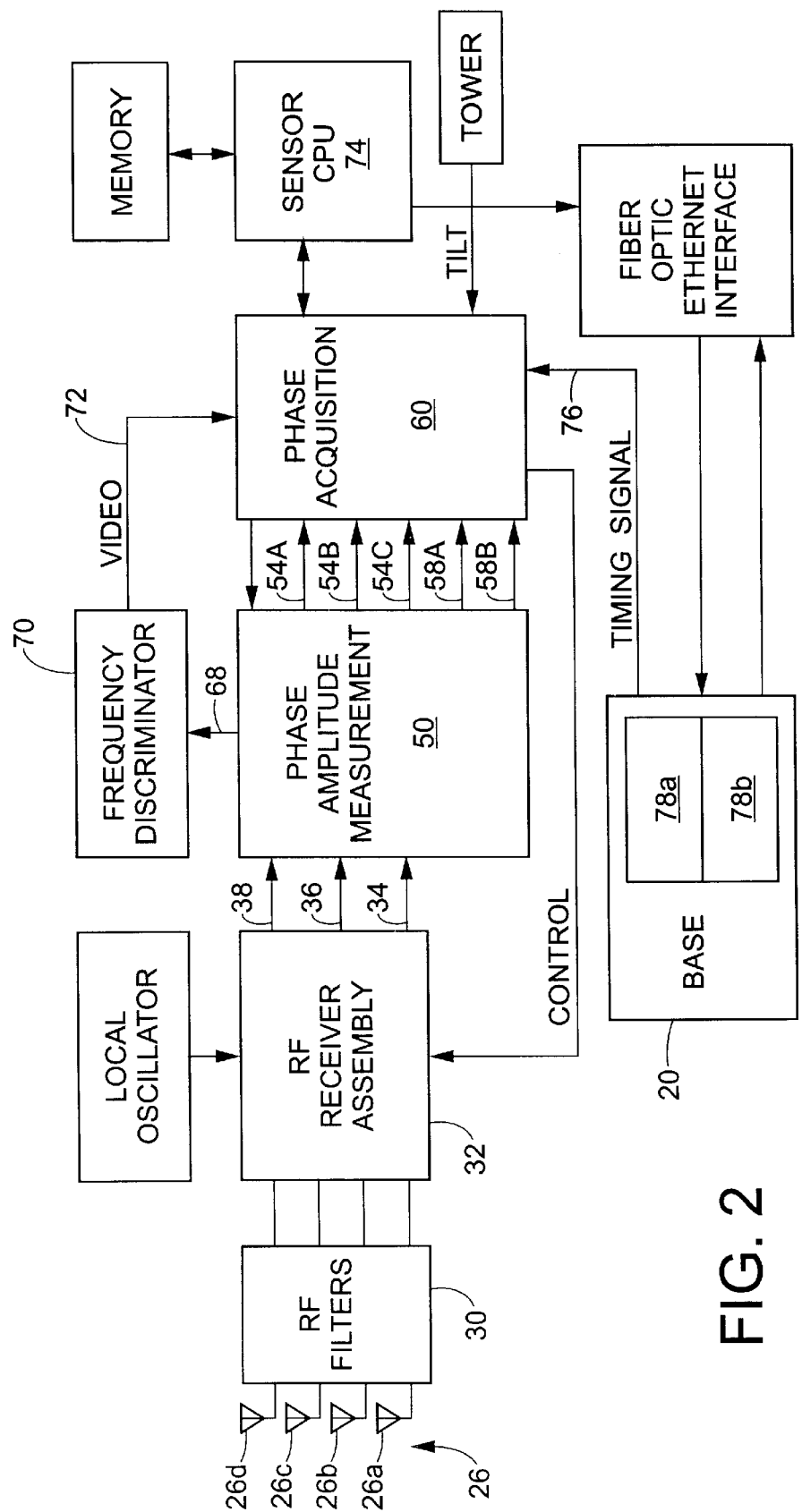
FIG. 2 is a block diagram of the AOA sensor and the antenna inputs with front-end RF assembly switching in accordance with this invention.

With reference now to FIG. 2, a functional block diagram of components is illustrated. Four antennas 26a–26d comprise the antenna array 26. For simplicity antenna array 28 is not depicted however those skilled in the art will appreciate that similar processing will occur on signals received on that array. Received reply signals are received on antennas 26, pass through filter 30 and are processed by the RF Receiver Assembly 32. By designating one of the antennas a reference 26a and measuring differential carrier phase between the reference antenna 26a and one of the remaining three antennas 26b–26d, three antenna array apertures are achieved and therefore three different resolution measurements are possible, for example low, medium and high. The reference antenna 26a is input to a dedicated receiver path 34. Other antennas 26b–26d are multiplexed into two RF Receiver paths 36, 38 using switches within the RF receiver assembly 32 although those skilled in the art can envision equivalent mechanisms to transfer signals to the assembly. Each path 34, 36, 38 receives 1090 MHz pulse modulated RF signals from the antennas 26 which originated from the responding transponder. The Phase Amplitude Measurement (PAM) 50 receives the intermediate frequency paths 34–38 from the RF Receiver assembly, and provides log video signals 54, and digitized phase data 58A, 58B to the Phase Acquisition Card (PAC) 60 for signal processing.

Two sets of digitized phase data are provided: the phase difference between the reference and IF channel A (low, medium, or high channels 26b–26d) 58A; and the difference between the reference and IF channel C (low, medium, or high channels) 58B. Log video of each of the three inputs is also passed to the PAC 54A, 54B, 54C. A limited IF signal 68 from the low resolution input is provided to the Frequency Discriminator 70. The Frequency Discriminator 70 receives the limited IF signal 68 of the RF Receiver assembly input, and provides an analog output 72 to the data acquisition section of the PAC 60 for frequency measurement. The PAC 60 thus also receives a start signal or synchronization timer coincident with the interrogation signal via fiber optic 74 from base 20 (FIG. 1), log video amplitude data 54, digital phase data 58 from the PAM 50, and frequency video 72 from the Frequency Discriminator 70. Those skilled in the art will appreciate that the synchronization signal may be transmitted by forms of data communication other than fiber optic cabling such as by wireless transmission, conventional hard wiring and the like. Alternately, the synchronization may be implemented through internal mechanisms on the several components such as by internal clocks or GPS signals.

Sensor acquisition begins processing RF inputs from the antennas 26 upon receipt of a start signal on cable 74. Transponder reply signals are analog processed and stored. Phase and frequency data is correlated with stop video signal acquisition data. All data passes to processors 78 in the base station 20.

Kalman filtering is used to improve the accuracy of the position estimate. The filtering improves the accuracy by using not only the most recent receiver measurements, but also the previously determined position, the statistical "reliability" of that position, and the statistical variance of the current measurements. The application of Kalman filtering to navigation systems is well understood by someone skilled in the art however, the following aspect of Kalman filter tuning is specialized to this invention. The process noise covariance matrix Q is usually a heuristic set to accommodate expected target maneuvers, but it may be set adaptively by more advanced formulations of the Kalman filter. The process noise covariance matrix Q is an "aging" matrix that allows acceleration events to occur in the state vector representing the aircraft dynamics. Usually one chooses an estimated Q and then "fine-tunes" it through computer simulation or flight test. A first approximation for Q is usually computed by considering the maximum acceleration that the aircraft is likely to perform. The optimal process noise setting is achieved in conjunction with applying the Diversity Antenna (DA) algorithm below.

Figure 3:
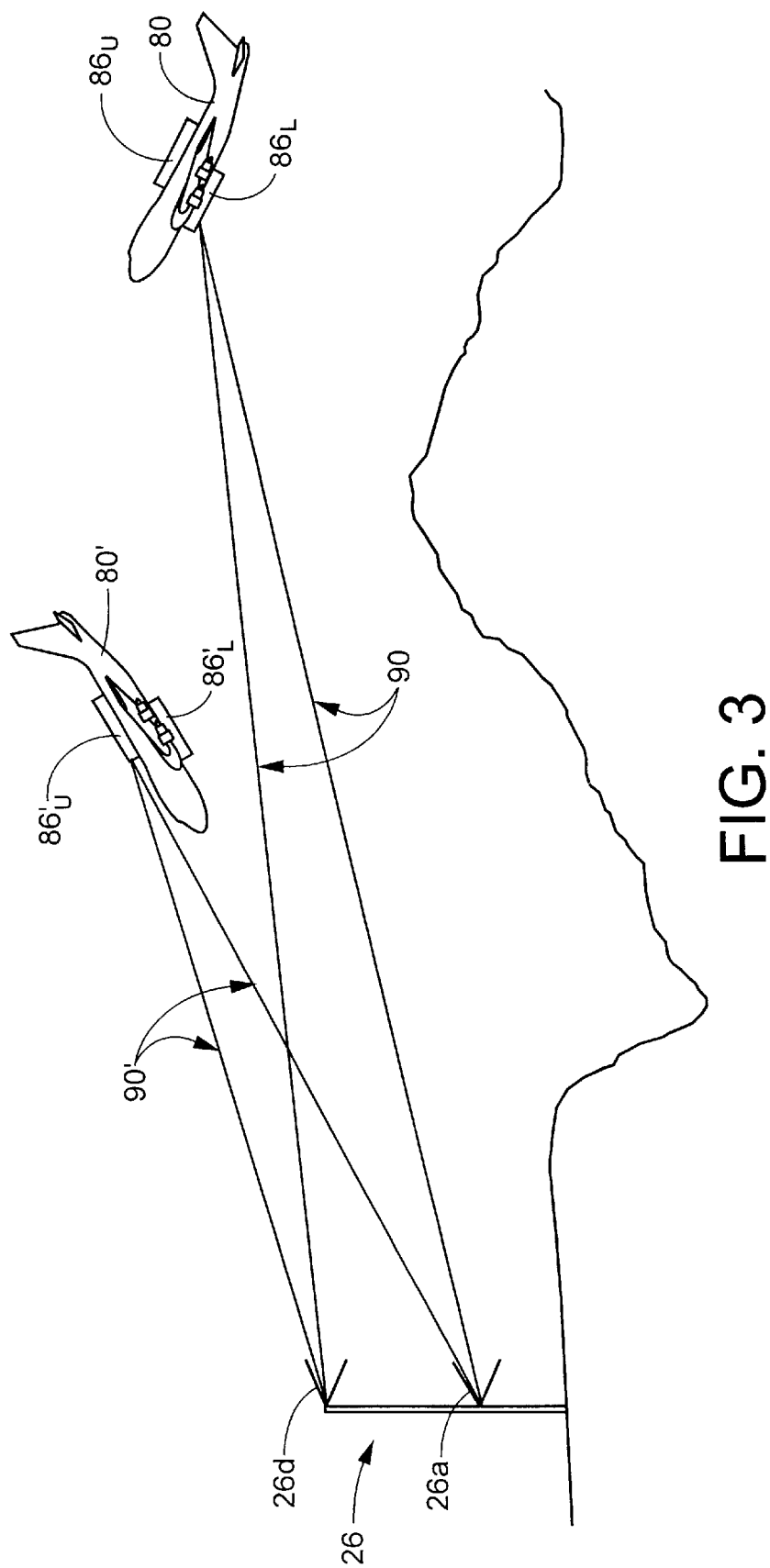
FIG. 3 is an illustration of error attributable to diversity aircraft antennas.

With reference now to FIG. 3 an exaggerated but exemplary illustration of the diversity antenna error is illustrated. An aircraft 80 approaching a runway is equipped with a lower antenna $86_L$ and an upper antenna $86_U$. As illustrated, at a first time aircraft 80 replies to an interrogation with the lower antenna $86_L$ and the signal 90 proceeds directly to the antenna array 26. Following the initial interrogation and reply sequence, the aircraft has moved and is now depicted by reference number 80'. As illustrated however, aircraft 80' because of attitude replies to a subsequent interrogation with the upper antenna $86_U$. As discussed above, because of the separation between the diversity antennas $86_L$, $86_U$ an error is introduced into the navigation problem. The processors 78 in the base station 20 (FIG. 2) are equipped with a diversity antenna algorithm which evaluates the digitized differential phase of reply signals over time to detect an aircraft transponder reply originating from diversity antennas. The algorithm uses the two Angle of Arrival (AOA) data sets, 58A and 58B, to establish the existence of a diversity antenna configuration and calculate the diversity antenna separation. As used herein, the term AOA is meant to imply any of a variety of methods to ascertain angular offset from some predetermined normal angle of incidence, and includes determining an actual angular offset, determining a phase difference between multiple signals or otherwise calculating a direction of arrival. As more fully explained below, AOA measurements that are determined to originate from the aircraft's upper diversity antenna are compensated for the diversity antenna separation, to produce a measurement set that would have the lower antenna as an emanation point.

In one presently preferred embodiment, the DA algorithm initializes parameters (Table 1) at the start of track acquisition. These parameters are tuned using simulation and field data by applying a wide range of aircraft types. During an approach to a runway, detection of measurement jumps, which could be due to a diversity antenna switching, is accomplished by examining the delta between the previous and current interrogation count. If the interrogation delta indicates sequential measurement samples, and the range of the TOA measurement is within the maximum range 1, the sine of the jump angle is calculated using the difference in phase from the last interrogation and the corresponding AOA antenna aperture, then a jump detected flag is set to indicate that data is present. If the sine of the jump angle is greater than the minimum 2 then the jump distance is calculated from the jump angle (meters) and the direction is determined. If the jump distance is between the minimum and maximum jump limits 3,4, then jump detected flag is set and jump amount is set to the distance. Lastly, the interrogation count and phase measurement are stored for comparison to the next interrogation's data. An alternate embodiment of this portion of the algorithm would use angle information only (2) at close range to determine when a jump occurred.

An additional embodiment, a jump-type (Table 2) includes assigning according to the result of the medium and/or high jumps. The confidence of a DA configuration is calculated by weighting the number of various types of measurement jumps 10. High and Medium channel jumps in the same direction have a large positive weight. In addition, the level of agreement between the High and Medium channel jumps is used to increase the weight. High and Medium measurement channel jumps in the opposite direction have a large negative weight. High channel jumps when there isn't a Medium available (due to AOA sensor antenna interleave) have a low positive weight. Likewise, Medium channel jumps when there is no High channel available have low positive weight. High or Medium channel jumps which occur when there is a Medium or High measurement available, but that don't indicate a jump have a low negative weight. Measurements that don't indicate any jump have zero weight. A diversity configuration existence flag is set after sufficient number of measurement updates has satisfied the jump-set criteria 9–12 indicating that the aircraft is equipped with diversity antenna.

Once established, both a DA separation track and DA separation variance track are estimated by two one-state Kalman filters with constant gain. The tracks are calculated 5–8 based on the average of High and Medium channel jumps in the same direction. An alternate embodiment of this portion of the algorithm would also use individual High or Medium channel jumps when a Medium or High, respectively, is not available, to calculate the tracks.

The antenna status 13–27 is maintained (i.e. upper or lower diversity antenna) along with the confidence in that status. A jump-type of SAME has a very high confidence in the direction indicated. A jump-type of OPPOSITE sets the status to unknown. A jump-type of HIGH, MEDIUM, HIGH NOISE, or MEDIUM NOISE has a high confidence only if the size of the jump matches the expected jump as indicated by the DA separation track, otherwise the status confidence is reduced. A jump-type of NO DATA reduces the status confidence. A jump-type of NONE does not change the status confidence. If the status changes from upper to lower or vice-versa, the status confidence is increased. In addition, the status confidence is increased based on the level of agreement between the jump and the DA separation track.

A reply that is determined to be from the upper diversity antenna, is adjusted to an emanation point that corresponds to the lower diversity antenna, based on the DA separation track. Window thresholds 28–35 are set up as minimum and maximum bounds with a skew applied to the window based on measurement track velocity 33. An adjustment is made to the window size based on the standard deviation of the separation estimate variance 31 and the expected measurement variance 32. A wide window, which is a linear scaling 36 of the normal window, is also set up. The difference between the medium and/or high measurement and the expected measurement is tested against these windows. The diversity antenna status confidence 37–38 is also tested. The results of these tests 39–43 are used to determine if the measurement should be adjusted. If so, the value of the DA separation track is subtracted from the measurement. An alternate embodiment of this portion of the algorithm would calculate the ratio between the DA separation track and the difference between the expected measurement and actual measurement. This value for the medium and/or high measurement along with the diversity antenna status and status confidence would be used to determine if the measurement should be adjusted.

TABLE 1

Diversity Antenna Algorithm Parameters

| | Parameter | Purpose |
|---|---|---|
| | *In accordance with evaluating measurement jumps caused by diversity antenna switching* | |
| 1 | jump_eval_max_rng | Maximum range to detect switching |
| 2 | min_jump_sin_theta | Minimum angle to detect switching |
| 3 | min_jump | Minimum DA switch |
| 4 | max_jump | Maximum DA switch |
| | *In accordance with estimating the separation of diversity antenna* | |
| 5 | sep_gain | Filter gain for estimating DA separation |
| 6 | sep_var_gain | Filter gain for estimating DA separation |
| 7 | use_medium_only_jumps | Controls use of medium only for estimating DA separation |
| 8 | use_high_only_jumps | Controls use of high only for estimating DA separation |
| | *In accordance with determining diversity antenna existence confidence* | |
| 9 | exist_conf_limit | Limit at which DA existence is confirmed |
| 10 | conf_weights[MAX_JUMP_SET] | Confidence weights for different types of measurement jumps |
| 11 | conf_same_ratio_weight | Confidence weight to apply towards same direction ratio |
| 12 | conf_same_ratio_limit | Limit for same direction ratio |
| | *In accordance with calculating the diversity antenna status* | |
| 13 | use_high_only_to_upper | Use high only jumps to set status to upper |
| 14 | use_medium_only_to_upper | Use medium only jumps to set status to upper |
| 15 | use_high_only_to_lower | Use high only jumps to set status to lower |
| 16 | use_medium_only_to_lower | Use medium only jumps to set status to lower |
| 17 | both_status_conf | Status confidence to use if both jump |
| 18 | high_only_status_conf | Status confidence to use if high only jump |
| 19 | medium_only_status_conf | Status confidence to use if medium only jump |
| 20 | expected_jump_bonus_conf | Confidence bonus to apply if jump matches expected |
| 21 | expected_jump_conf_limit | Confidence limit at which an expected jump can be determined |
| 22 | same_ratio_bonus_conf | Confidence bonus for a high ratio between same jumps |
| 23 | same_ratio_bonus_limit | Ratio at which bonus starts to apply |
| 24 | status_conf_reduce | Amount to reduce confidence when there are missed detection opportunities (e.g. Medium on channel A & Medium on channel C when medium is not used to set status) |
| 25 | one_meas_trk_ratio_limit | Ratio between a measurement jump and the DA separation track at which the meas_trk_bonus begins to apply. This is for the case when there is only one measurement |
| 26 | two_meas_trk_ratio_limit | Ratio between a measurement jump and the DA separation track at which the meas_trk_bonus begins to apply. This is for the case when there are two measurements but only one indicates a jump (i.e. Med. Noise or High Noise). |
| 27 | meas_trk_bonus_conf | Confidence bonus to apply based on the ratio between a single measurement and the track |
| | *In accordance with compensating the AOA measurement if from the upper transponder antenna* | |
| 25 | smallest_window_min | Smallest allowed window minimum |
| 29 | largest_window_max | Largest allowed window maximum |
| 30 | baseline_sep | Nominal amount to allow for DA window |
| 31 | sep_weight | Weighting factor for DA separation uncertainty |
| 32 | meas_trk_weight | Weighting factor for measurement track uncertainty |
| 33 | meas_vel_weight | Weighting factor for measurement track velocity |
| 34 | upper_weight | Weighting factor if upper antenna |
| 35 | lower_weight | Weighting factor if lower antenna |
| 36 | wide_window_weight | Weighting factor to determine slightly wider window |
| 37 | status_highest_conf | Level at which status confidence is highest |
| 38 | status_high_conf | Level at which status confidence is high |
| 39 | normal_window_pts | Adjustment points for normal window |
| 40 | wide_window_pts | Adjustment points for wide window |
| 41 | status_highest_pts | Adjustment points for highest confidence |

TABLE 1-continued

Diversity Antenna Algorithm Parameters

| | Parameter | Purpose |
|---|---|---|
| 42 | status_high_pts | Adjustment points for high confidence |
| 43 | pts_limit | Points required to adjust |

TABLE 2

Jump-types and associated angle-of-arrival measurement event

| Jump-type | Measurement event associated with indicated jump-type |
|---|---|
| Same | High and Medium indicate a DA jump in the same direction. |
| Opposite | High and Medium indicate a DA jump in the opposite direction. |
| High | High indicates a DA jump and there is no medium available for comparison purposes. |
| Medium | Medium indicates a DA jump and there is no high available for comparison purposes. |
| High Noise | High indicates a DA jump and medium does not. This implies a noisy high measurement. |
| Medium Noise | Medium indicates a DA jump and high does not. This implies a noisy medium measurement. |
| None | Neither high or medium indicate a DA jump and data is available for at least one of them. |
| No Data | No data is available for either high or medium. |

Figure 4:
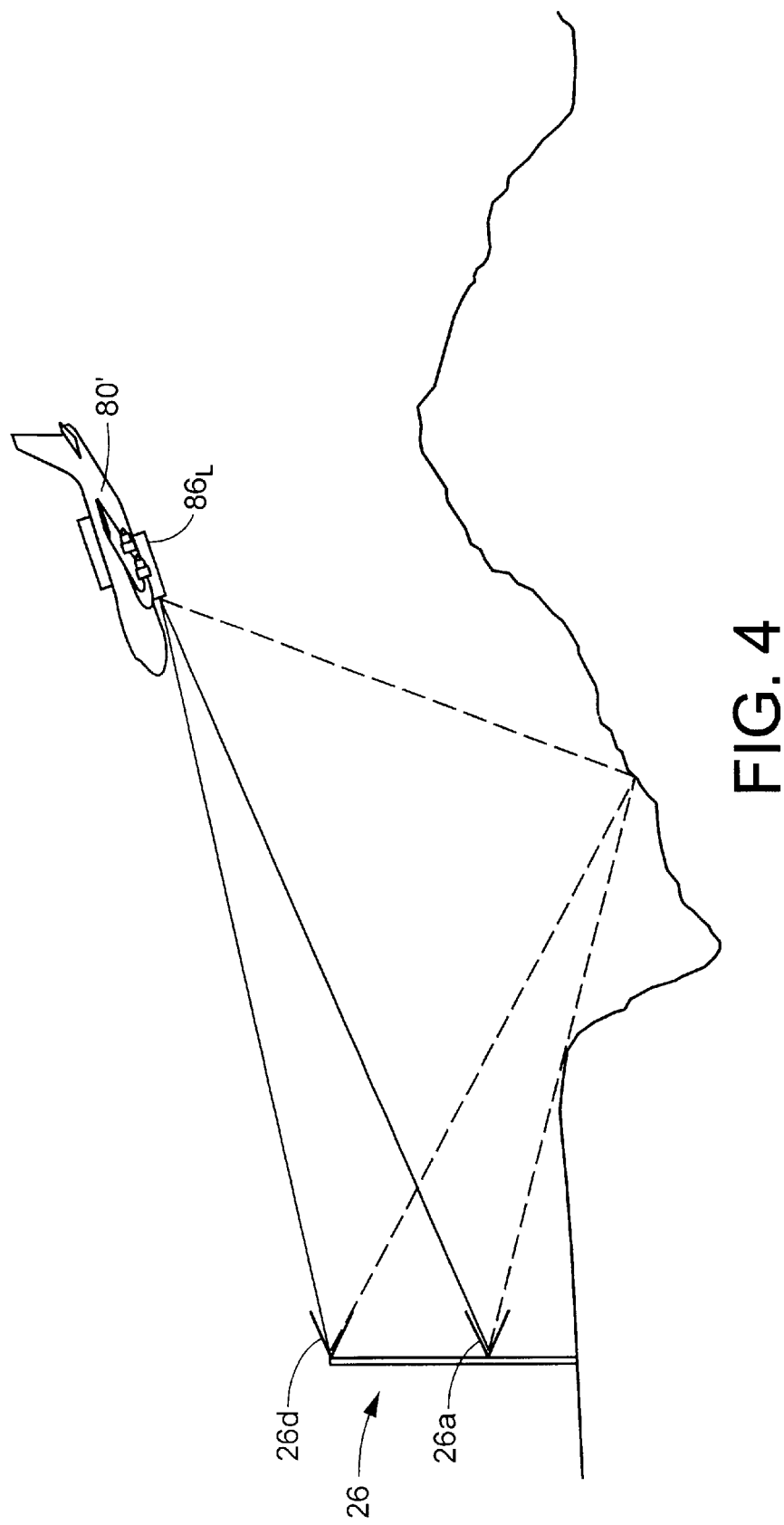
FIG. 4 is an illustration of error attributable to multipath signal transmission; and, FIG. 5 is a flow chart illustrating processing occurring in the processors, which suitably practices the present invention.

With reference now to FIG. 4, an illustration of multipath returns is provided. Signals travelling between an aircraft 80 and antennas 26a–26d can follow two or more propagation paths between respective antennas. The first path is along direct line-of-sight 90 and the other paths are reflections from either the ground, hills, buildings vehicles, aircraft or other objects, as a function of the objects conductivity, size orientation and the signal angle-of-incidence. The reflections from objects that are very close to the direct path and allow the reflected signal to arrive very soon after the direct path signal are commonly known as short-path multipath 92. Reflections from objects further from the direct path can cause what is commonly known as long-path multipath. Short-path multipath 92 can impact AOA measurement accuracy, since the carrier phase of the signal that impinges on the AOA antennas is the vector sum of the direct and multipath components. Further references to the short-path variety of multipath will be referred to herein as multipath 92.

Multipath errors on the reply signals are corrected by entering a lookup table with an initial estimated aircraft position, returning with the phase offset calibrated to compensate for expected errors induced in each of the low, medium, and high resolution channels as a function of aircraft position in range, azimuth, and/or elevation. Of course those skilled in the art will appreciate that selecting various corrections from the lookup table will require some amount of interpolation, thresholding or other intermediate selection techniques to determine correction values for positions in between calibrated positions. Indeed, the transponder diversity antenna switching (as discussed above) is detected more reliably with the multipath calibration correction applied to the AOA measurements prior to employing the DA algorithm.

Recalling that multiple antennas 26a–26d are disposed together to form an array 26 desirably provides multiple apparent apertures, thus resolutions, for analysis. Accordingly, interleaving among various channels depending on the phase of the approach and the confidence of the position estimate is desirable.

Initially, the antenna interleave is initially set to the low pattern per Table 3. The low pattern of interleave rates provide sufficient low-resolution measurements to establish a reliable estimate of the aircraft position. The low-resolution channel provides a beam width greater than that of the medium or high channels and is used to select from the ambiguous cycles available on the medium and high channels. An alternate embodiment of the invention uses the Mode C response from the transponder to resolve cycle ambiguity for the medium and high channels, instead of using the low channel to resolve cycle ambiguity. During an aircraft approach the track processing algorithm determines the antenna interleave for subsequent interrogations based on the position of the aircraft with respect to the desired approach path angle and the desired accuracy of the aircraft position estimate, and then sets the antenna interleave to the low, high or approach patterns. For optimal diversity antenna detection and compensation the approach pattern is most desirable as it provides the maximum opportunity to compare subsequent medium and high channel measurements. An alternate embodiment of the antenna configuration includes programmable control of a phased array to select the apparent aperture.

TABLE 3

AOA Antenna Interleave Rates

| Update | Low Pattern | | High Pattern | | Approach Pattern | |
|---|---|---|---|---|---|---|
| # | Ch. A | Ch. C | Ch. A | Ch. C | Ch. A | Ch. C |
| 1 | Low | Low | High | High | High | High |
| 2 | High | High | Med. | Med. | Med. | Med. |
| 3 | High | Low | High | Med. | High | Med. |
| 4 | Med. | Med. | Low | Low | High | Med |
| 5 | Med. | Low | High | Med. | High | Med. |
| 6 | High | Low | High | Low | High | Med. |
| 7 | High | Med. | High | Med. | High | Med. |
| 8 | Med. | Low | High | Low | High | Med. |
| 9 | High | Low | High | Med. | High | Med |
| 10 | High | Med. | High | Low | High | Med. |
| 11 | Med. | Low | High | Med. | High | Med. |
| 12 | High | Low | High | Low | High | Med. |
| 13 | High | Med. | High | Med. | High | Med. |
| 14 | Med. | Low | High | Low | High | Med |
| 15 | High | Low | High | Med. | High | Med. |
| 16 | High | Med. | High | Low | High | Med. |
| 17 | Med. | Low | High | Med. | High | Med. |
| 18 | High | Low | High | Low | High | Med. |
| 19 | High | Med. | High | Med. | High | Med |
| 20 | Med. | Low | High | Low | High | Med. |

Figure 5:
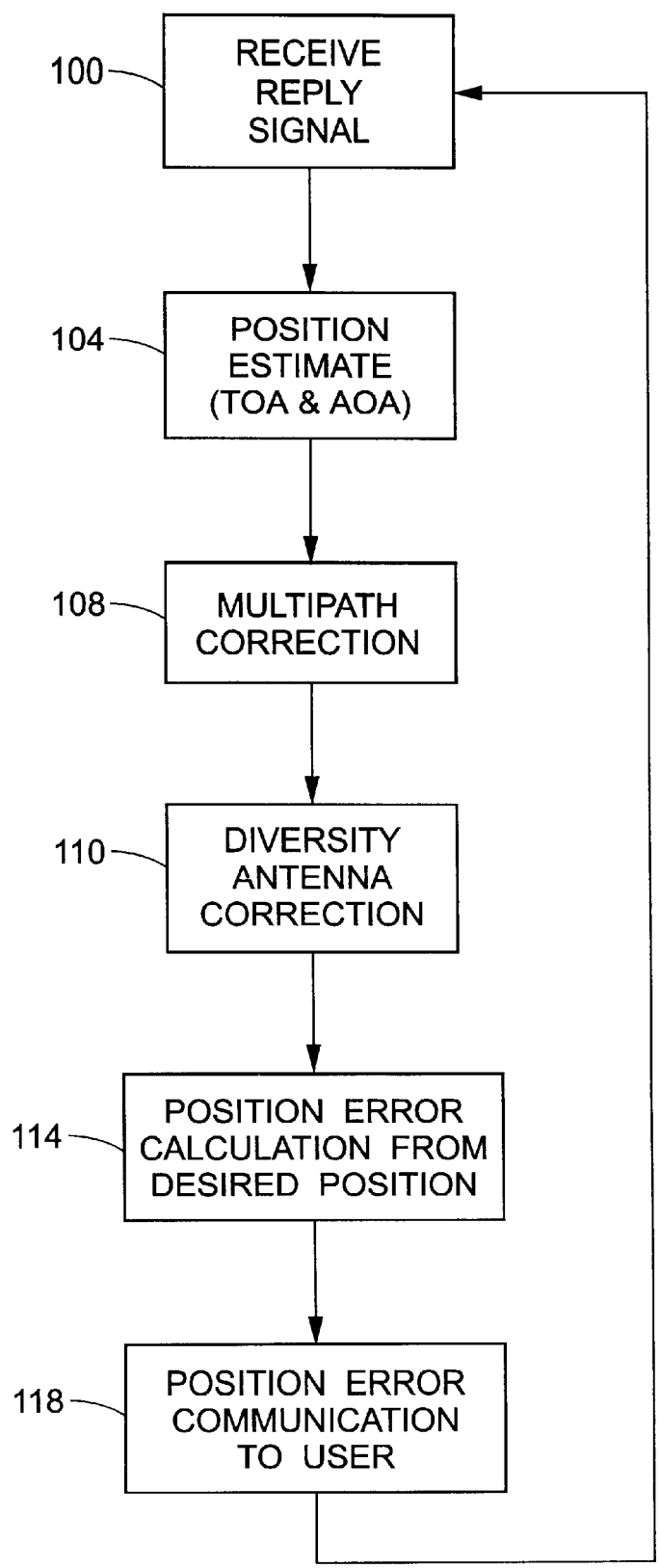

With reference now to FIG. 5, an overview flowchart of steps which suitably practice the present invention are illustrated. An aircraft antenna 86 transmit a reply signal 90 which is received on a ground based antenna array 26, as seen in step 100. The received signals are sent to processors 78 in the base 20 to generate a position estimate from the time of arrival and the angle of arrival of the reply signal 90, as seen in step 104. The central processors 78 in the base 20 then perform corrections in the initial position estimate to account for multipath returns of the reply signals 90, as seen in step 108. Following the multipath correction, the central processors 78, running a DA algorithm employing antenna interleaving over successive updates, determine whether the approaching aircraft 80 is responding via diversity antennas $86_L$, $86_U$ and applies a correction to the position estimate based on that determination, as seen in step 110.

The central processors 78 calculate a position error by comparing the adjust aircraft position with a desired position, such as an approach path, as seen in step 114. Those skilled in the art can appreciate that any type of approach path consisting of a plurality of interconnected positions which can be compared against a desired aircraft position can be employed. In other words, different from the conventional straight-in approaches now utilized at many airport facilities, approach corridors can be defined which avoid noise-sensitive areas, and terrain features, and/or circumnavigate areas over which aircraft traffic is not desirable. The processors 78 convert the determined position into a format usable by a user, such as an air traffic controller or aircraft pilot, as seen in step 118.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalent thereof.

Having thus set forth the preferred embodiment, the invention is now claimed to be:

1. A method of determining a position of an aircraft having a transponder which transmits a reply signal in response to an interrogation signal, the method comprising:
   receiving the reply signal on a plurality of antennas disposed as a vertically oriented array;
   estimating a position of the aircraft from the received reply signal;
   determining selected characteristics of the reply signal; and,
   analyzing the selected characteristics to determine whether selected reply signals originate from different antennas on the aircraft.

2. The method as set forth in claim 1, further comprising:
   based on the analyzing step, adjusting the estimated position to compensate for the reply signals originating from different antennas on the aircraft.

3. The method as set forth in claim 2, further comprising:
   calculating an error between the adjusted position and a desired position; and
   conveying the error to a user.

4. The method as set forth in claim 1, where the estimating a position comprises:
   determining an elapsed time between the interrogation signal and the reply signal; and
   determining an angle of arrival of the reply signal relative to the vertically oriented array.

5. The method as set forth in claim 4, where the selected characteristics include differential phase of the reply signal on selected antennas, and the analyzing comprises:
   comparing a set of reply signals; and
   setting an indicator when the comparing exceeds a predetermined value indicating that the reply signals originate from more than one antenna.

6. The method as set forth in claim 1, wherein the reply signal propagates between the aircraft antenna and the antenna array on paths including a direct path and a reflected path, the method further comprising:
   applying a multipath correction determined to correct for an error induced by signal travel on the reflected path.

7. The method as set forth in claim 6, where the applying step comprises:
   determining a multipath correction from a plurality of stored corrections based on the estimated position.

8. The method as set forth in claim 1, further comprising:
   receiving the reply signal on a plurality of antennas disposed as a horizontally oriented array; and
   determining an angle of the reply signal relative to the horizontally oriented antenna array.

9. The method as set forth in claim 1, wherein the determining comprises:
   receiving the reply signal on a reference one of the plurality of antennas;
   receiving the reply signal on another of the plurality of antennas; and
   determining a difference in phase between the signal received on the reference antenna and the signal received on the other antenna.

10. A precision glide path apparatus for guiding aircraft along an approach path within operable range of an interrogator which transmits an interrogation signal, the aircraft having a transponder switchably connected between two antennas, the transponder transmitting a reply signal in response to the interrogation signal, the apparatus comprising:
    a) an elevation measurement system comprising:
       i) a plurality of antennas,
       ii) a synchronized timer which determines a time between the interrogation signal and receipt of the transponder reply signal at each of the plurality of antennas, and
       iii) a differential carrier phase calculator which calculates a differential carrier phase between a first receive channel including a first antenna, and a second receive channel including a second antenna; and
    b) a central processor comprising:
       i) a time based position estimator which estimates a position based on the synchronized time of reply signal receipt on selected antennas,
       ii) a diversity antenna calculator which detects reply signals emanating from more than one antenna on the aircraft, estimates a distance between the aircraft antennas, and compensates the differential carrier phase by the estimated distance, and
       iii) a combined position calculator which determines a position based on the compensated differential carrier phase and the time based position estimate.

11. The precision glide path apparatus as set forth in claim 10, wherein four receive channels receive input from four antennas.

12. The precision glide path apparatus as set forth in claim 10 wherein the combined position calculator calculates an angle of the reply signal relative to the plurality of antennas by interleaving among the receive channels.

13. The precision glide path apparatus as set forth in claim 10, further comprising:
    a multipath error corrector which selects a multipath correction as a function of aircraft elevation.

14. The precision glide path apparatus as set forth in claim 10, further comprising:

a multipath error corrector which selects a multipath correction as a function of aircraft range.

15. The precision glide path apparatus as set forth in claim 10, further comprising:

a multipath error corrector which selects a multipath correction as a function of aircraft azimuth.

16. A transponder landing system comprising:

an antenna array disposed orthogonally to a landing area, the array being sensitive to a reply signal;

a elevation processor in operative communication with the array, the processor calculating a range based on a time of receipt of the reply signal, and an angle of the reply signal relative to the array; and a correction processor which corrects for position errors induced by multipath receipt of reply signals as a function of the calculated range.

17. The transponder landing system as set forth in claim 16, where the correction processor comprises:

a stored set of corrections selectable according to the calculated angle of the reply signal.

18. The transponder landing system as set forth in claim 16, further comprising:

a diversity antenna processor which detects reply signals originating from more than one aircraft antenna, and adjusts the estimated position based on a separation of the aircraft antennas.

19. A position determining method comprising:

receiving a reply signal transmitted in response to an interrogation signal on a plurality of receivers at known locations;

calculating an estimated position based on a time difference of receipt of the reply signal on the plurality of antennas and on a phase difference of the reply signal on the plurality of antennas; and correcting for multipath errors in the estimated position by adjusting the estimated position based on a range determined from the time difference of receipt of the reply signal and an azimuth determined from the phase difference of the reply signal.

20. The position determining method as set forth in claim 19, further comprising:

detecting multiple origination points of reply signals; and correcting for errors in the estimated position induced by the detected multiple origination points.

* * * * *